US009190827B2

(12) United States Patent
Dougal et al.

(10) Patent No.: US 9,190,827 B2
(45) Date of Patent: Nov. 17, 2015

(54) SOFT RESTARTING OF A POWER NETWORK USING INVERTER-CONTROLLED ENERGY STORAGE SYSTEM

(71) Applicants: Roger A. Dougal, Columbia, SC (US); Asif Anwar, Columbia, SC (US); Yucheng Zhang, Columbia, SC (US)

(72) Inventors: Roger A. Dougal, Columbia, SC (US); Asif Anwar, Columbia, SC (US); Yucheng Zhang, Columbia, SC (US)

(*) Notice: Subject to any disclaimer, the term of this patent is extended or adjusted under 35 U.S.C. 154(b) by 178 days.

(21) Appl. No.: 13/954,101

(22) Filed: Jul. 30, 2013

(65) Prior Publication Data

US 2014/0049865 A1 Feb. 20, 2014

Related U.S. Application Data

(60) Provisional application No. 61/741,951, filed on Jul. 30, 2012.

(51) Int. Cl.
*H02H 3/06* (2006.01)
*H02J 9/06* (2006.01)

(52) U.S. Cl.
CPC . *H02H 3/06* (2013.01); *H02J 9/062* (2013.01)

(58) Field of Classification Search
CPC .................................. H02H 3/06; H02J 9/062
USPC .......................................................... 361/62
See application file for complete search history.

(56) References Cited

U.S. PATENT DOCUMENTS

| 6,215,202 | B1 * | 4/2001 | Luongo et al. ................... 307/64 |
| 8,310,095 | B2 * | 11/2012 | Angquist et al. ................. 307/48 |
| 2005/0012395 | A1 * | 1/2005 | Eckroad et al. .................. 307/44 |
| 2013/0099565 | A1 * | 4/2013 | Sachs et al. ...................... 307/25 |

OTHER PUBLICATIONS

Anwar et al., "Fault Current Reduction Using Inverter Controlled Energy Storage for Shipboard MVAC Power System", IEEE Electric Ship Technologies Symposium, Alexandria, Virginia, Apr. 10-13, 2011, pp. 315-318.
"DynaPeaQ, SVC Light with Energy Storage", ABB: Link: www05.abb.com—12 pages.
Geidl, "Protection of Power Systems with Distributed Generation: State of the Art", Power Systems Laboratory, Swiss Federal Institute of Technology (ETH), Jul. 20, 2005—35 pages.
"IEEE Standard for Interconnecting Distributed Resources with Electric Power Systems", IEEE Std. 1547.2-2008, Apr. 15, 2009—13 pages.

(Continued)

*Primary Examiner* — Scott Bauer
(74) *Attorney, Agent, or Firm* — Dority & Manning, P.A.

(57) ABSTRACT

Systems and methods for softly restarting a power network using an inverter-controlled energy storage system are provided. In response to an event such as a fault or other condition, a power network bus that provides power to one or more industrial loads (e.g. motors) can be disconnected from the utility grid. Instead of automatically recoupling the power network bus to the grid after a specified time period, a soft restart is accomplished by pre-energizing the power network bus with an energy storage system (ESS) according to a ramp up process and synchronizing the power network bus with the utility grid while the power network bus operates in an islanded mode. The power network bus can then be reconnected to the utility grid, for instance, by reclosing the one or more circuit breakers coupled between the power network bus and the utility grid.

17 Claims, 6 Drawing Sheets

(56) References Cited

OTHER PUBLICATIONS

Lindenmeyer et al., "Power System Restoration—A Bibliographical Survey", International Journal of Electrical Power and Energy Systems, vol. 23, No. 3, Mar. 1, 2001, pp. 219-227.

"Mid-American Energy Technical Requirements for New Interconnections of Generation to the MidAmerican Energy Transmission System", MidAmerican Energy, Mar. 23, 2011—29 pages.

Mozina, "Interconnection Protection of IPP Generators at Commercial/Industrial Facilities", IEEE Transactions on Industry Applications, vol. 37, No. 3, May/Jun. 2001, pp. 681-688.

Mulhausen et al., "Anti-Islanding Today, Successful Islanding in the Future". 36$^{th}$ Annual Western Protective Relay Conference, Spokane, WA, Oct. 20-22, 2009.

* cited by examiner

SOFT RESTARTING OF A POWER NETWORK USING INVERTER-CONTROLLED ENERGY STORAGE SYSTEM

PRIORITY CLAIM

The present application claims the benefit of priority of U.S. Provisional Patent Application No. 61/741,951, titled Soft Restarting of Industrial Power Network Using Inverter Controlled Energy Storage System, filed on Jul. 30, 2012, which is incorporated herein by reference for all purposes.

GOVERNMENT SUPPORT CLAUSE

The present invention was made with government support under N00014-08-1-0080 awarded by the Office of Naval Research. The government has certain rights in this invention.

FIELD

The present disclosure relates generally to power networks and more particularly to the soft restarting of a power network using an inverter-controlled energy storage system.

BACKGROUND

Industrial processes can suffer large financial losses following power disruptions. A typical method of restoring power service to loads is to reclose tripped circuit breaker(s), either manually or automatically, after some preset interval. Following reclosing there is a large current inrush to the load—often well in excess of the current that served the loads prior to the outage or interruption. This inrush current can overstress and degrade the reliability of the breaker/recloser hardware and can reduce their lifetime. The inrush current can also damage the loads themselves. Moreover, when power is resupplied by the reclosing of circuit breakers, all motors of the industrial loads can attempt to start at the same time. Motor starting characteristics can require up to ten times normal operating current during start up. This large current demand can result in voltage depression which can quickly cascade into total voltage collapse. Power companies can impose limits on the amount of current drawn and the maximum number of starts during a given time period, such as over the course of an hour or a day, to limit such voltage collapse.

Service restoration after an outage or power disruption can involve manual restarts to ensure safety during process restarts. The manual restart process can take a significant period of time (e.g. 45 minutes). Moreover, the restarting sequence has to be considered and timed to reduce inrush current and voltage fluctuations. Soft-starters have been used to limit inrush currents for larger motors. Installment of soft-starters can avoid penalties imposed by power companies on the amount of current drawn and the maximum number starts per time period. However, soft-starters are not always a viable solution considering the added costs of the soft-starters and the potential for injecting harmonic currents into the power network, which may aggravate power factor.

Energy storage systems have been used as an auxiliary source for power networks for applications ranging from peak load support to power quality control. An energy storage system typically includes a power source (e.g. a battery source, fuel cell, generator, capacitor bank, or other suitable power source) that is coupled to the power network via an inverter. The inverter converts the power available from the power source to a suitable alternating current power for application to the industrial power network.

The potential of using an energy storage system during reclosure has not been fully realized due to grid regulations. For instance, to avoid asynchronous reclosure, energy resources may have to be disconnected and a dead-bus condition may have to be achieved prior to reconnection with the utility grid. Achieving a dead-bus condition can require extended downtime after a power outage or disruption.

Thus, a need exists for a method for service restoration of industrial loads in an industrial power network that reduces transients and process downtime. A system and method that can take advantage of the fast dynamics of an energy storage system inverter and existing protection relays would be particularly useful.

SUMMARY

Aspects and advantages of the invention will be set forth in part in the following description, or may be obvious from the description, or may be learned through practice of the invention.

One exemplary aspect of the present disclosure is directed to a method of service restoration for a power network. The power network includes a power network bus coupled to one or more industrial loads. The power network can further include an energy storage system capable of being coupled to the power network bus. The energy storage system can have an inverter that can be controlled to provide an inverter current from the energy storage system to the power network bus. The method includes decoupling the power network bus from the utility grid in response to an event. After decoupling, the method includes energizing the power network bus with the energy storage system via the inverter according to a ramp up process. The method further includes synchronizing the power network bus with the utility grid and recoupling the power network bus to the utility grid when the power network bus is synchronized with the utility grid.

Another exemplary aspect of the present disclosure is directed to an industrial power network. The industrial power network can include a power network bus coupled to a utility grid and one or more industrial loads coupled to the power network bus. The network can further include an energy storage system capable of being coupled to the power network bus. The energy storage system can include an inverter configured to be controlled to provide inverter current from the energy storage system to the power network bus. The industrial power network can further include a control system configured to implement one or more operations in response to an event to recouple the power network bus to the utility grid. The one or more operations include decoupling the power network bus from the utility grid in response to the event; after decoupling, energizing the power network bus with the energy storage system via the inverter according to a ramp up process; synchronizing the power network bus with the utility grid; and recoupling the power network bus to the utility grid when the power network bus is synchronized with the utility grid.

Yet another exemplary aspect of the present disclosure is directed to a method of service restoration for a power network. The method includes detecting a fault condition in the power network and tripping one or more circuit breakers coupled between a power network bus and a utility grid in response to the fault condition. The method further includes energizing the power network bus with an inverter of an energy storage system using an open loop constant voltage/frequency ramp. The method further includes determining whether the frequency of the power network bus is within a tolerance of the frequency of the utility grid and synchronizing the power network bus with the utility grid by stepping up the frequency of the inverter when the frequency of the power network bus is within the tolerance of the frequency of the utility grid. The method further includes determining whether a phase difference between a voltage phase of the power network bus and a voltage phase of the utility grid is about zero and reclosing the one or more circuit breakers coupled between the power network bus and the utility grid when the phase difference is about zero. The method can further include decoupling the inverter of the energy storage system from the power network bus.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
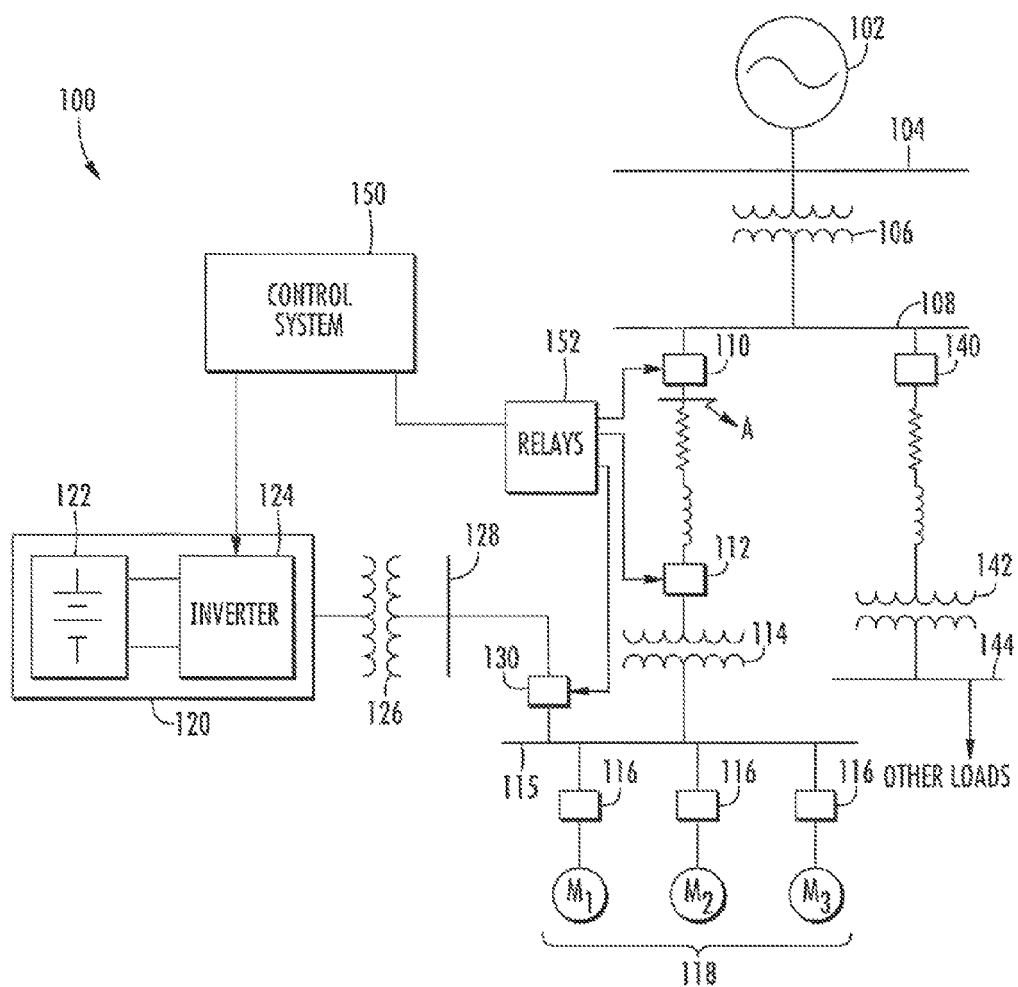
FIG. 1 depicts an exemplary power network according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Generally, the present disclosure is directed to systems and methods for softly restarting a power network using an inverter-controlled energy storage system. More particularly, in response to an event such as a fault or other condition, a power network bus that provides power to one or more industrial loads (e.g. motors) can be disconnected from the utility grid. For instance, one or more breakers coupled between the power network bus and the utility grid can be tripped, disconnecting the power network bus from the utility grid. Instead of automatically reclosing the one or more circuit breakers after a predefined time interval, a soft restart is accomplished by pre-energizing the power network bus with an energy storage system according to a ramp up process and synchronizing the power network bus with the utility grid while the power network bus operates in an islanded mode. The power network bus can then be reconnected to the utility grid, for instance, by reclosing the one or more circuit breakers coupled between the power network bus and the utility grid.

Aspects of the present disclosure will be discussed with reference to an industrial power network for purposes of illustration and discussion. Those of ordinary skill in the art, using the disclosures provided, should understand that the present techniques can be applied in other power networks, such as a power network for distributing power to residential loads (e.g. HVAC units).

According to particular aspects of the present disclosure, the ramp up process can include controlling the inverter of the energy storage system to provide a voltage ramp and a frequency ramp to the power network bus. For example, in one embodiment, the voltage ramp and the frequency ramp of the power network bus can be controlled according to an open loop control scheme that applies a constant linear or other suitable voltage and frequency ramp with constant ramp slopes. Once the voltage, frequency, and phase of the power network bus are synchronous with the utility grid, the power network bus can be reconnected to the utility grid.

In another embodiment, the ramp up process can include controlling the inverter according to a closed loop control scheme wherein the voltage and frequency is based at least in part on characteristics of the one or more loads connected to the power network bus so that the ramp-up/synchronization process is faster and such that the starting inrush current is maintained below a threshold. For instance, the voltage and frequency ramp can be controlled based at least in part on the inverter current provided by the inverter to the power network bus. As used herein, inverter current refers to the AC current supplied from the inverter to the power network.

The soft restarting according to exemplary aspects of the present disclosure eliminates a number of problems and reduces the losses encountered due to power outages and momentary interruptions. For example, restoration of service according to aspects of the present disclosure can yield the following benefits: (1) starting inrush currents can be reduced; (2) voltage dip during motor start up can be reduced; (3) torque transients can be reduced; (4) power equipment such as distribution transformers can be downsized or their maintenance/replacement can be delayed; and (5) unsuccessful reclosing attempts can be avoided following permanent faults or temporary/short interruptions. Moreover, in particular implementations, the requirement for a dead-bus condition can be avoided. In this manner, the soft restarting methods according to aspects of the present disclosure can reduce consequential damages, scrap-losses, motor starting inrush current that cause voltage dips, and breaker reclosing transients.

Exemplary Power Network

FIG. 1 depicts an exemplary power network 100 according to an exemplary embodiment of the present disclosure. The particular configuration of the power network 100 of FIG. 1 is presented for purposes of illustration and discussion. Those of ordinary skill in the art, using the disclosures provided herein, will understand that the power network 100 can be adapted or configured in various ways without deviating from the scope of the present disclosure.

The power network 100 of FIG. 1 is connected to an electrical utility grid 102 at substation bus 104. The utility grid 102 feeds a distribution bus 108 via a transformer 106. Power can be distributed throughout the power network 100 from the distribution bus 108. For instance, the distribution bus 108 can be coupled through a conductor to a power network bus 115 via a transformer 114. A plurality of circuit breakers 110 and 112 can be coupled between the power network bus 115 and the distribution bus 108 and thus coupled between the power network bus 115 and the utility grid 102. A plurality of electrical loads, such as motors 118, can be coupled to the power network bus 115. Three motors 118 are depicted in FIG. 1. However, any number of motors or other electrical loads can be coupled to the power network bus 115. Circuit breakers 116 can be coupled between the power network bus 115 and the motors 118 for protection of the motors 118 and other equipment and components of the power network 100.

The distribution bus 108 can distribute power to other components of the power network 100. For example, the distribution bus 108 can be coupled to a power network bus 144 via a transformer 142. A circuit breaker 140 can be coupled between the power network bus 144 and the distribution bus 108. The power network bus 144 can distribute power to other electrical loads (e.g. lighting and other loads) of the power network 100. The distribution bus 108 can distribute power to other components and equipment (not illustrated) without deviating from the scope of the present disclosure.

The power network 100 of FIG. 1 includes an energy storage system 120. The energy storage system 120 includes an energy source 122 and an inverter 124. The energy source 120 can be any suitable energy source, such as a battery source, fuel cell, generator, capacitor bank, or other suitable energy source. The inverter 124 can convert the power from the energy source 122 into a suitable AC power for application to the power network 100. The inverter 124 can include one or more switching elements (e.g. semiconductor switching elements such as insulated gate bipolar transistor (IGBTs)) that can be controlled to adjust the inverter current supplied by the inverter 124 to the power network 100. The inverter 124 can be coupled to an energy storage bus 128 via a transformer 126. The energy storage bus 128 can be coupled to the power network bus 115 via a circuit breaker 130.

The power network 100 can further include a control system 150 for controlling aspects of the power network 100. The control system 150 can control the inverter 124 and other components of the energy storage system 120. The control system 150 can include one or more control devices, such as processors, microcontrollers, or other control devices.

In a particular implementation, the control system 150 can include one or more processors and one or more computer-readable media. The one or more processors can execute instructions stored on the one or more computer-readable media to provide desired functionality, such as controlling the inverter 124 to implement the soft restarting of the power network 100 according to exemplary aspects of the present disclosure. Exemplary techniques for controlling the components of the power network 100 to achieve soft restarting will be discussed in more detail with reference to FIG. 2 below.

The control system 150 can include various sensors for monitoring parameters of various different components of the power network 100. The control system 150 can also control or be coupled to various relays 150 that are used to control components of the power network 100, such as circuit breakers 110, 112, 130, 116 and other circuit breakers and components in the power network 100. The relays 150 can be controlled by the control system 150 to implement soft restarting of the power network 100. Some exemplary relays can include frequency relays to prevent islanded operation and synchronization relays for service restoration and load transfer. These protective devices can be required in the power network 100 to ensure compliance with grid codes.

Exemplary Method for Service Restoration

Figure 2:
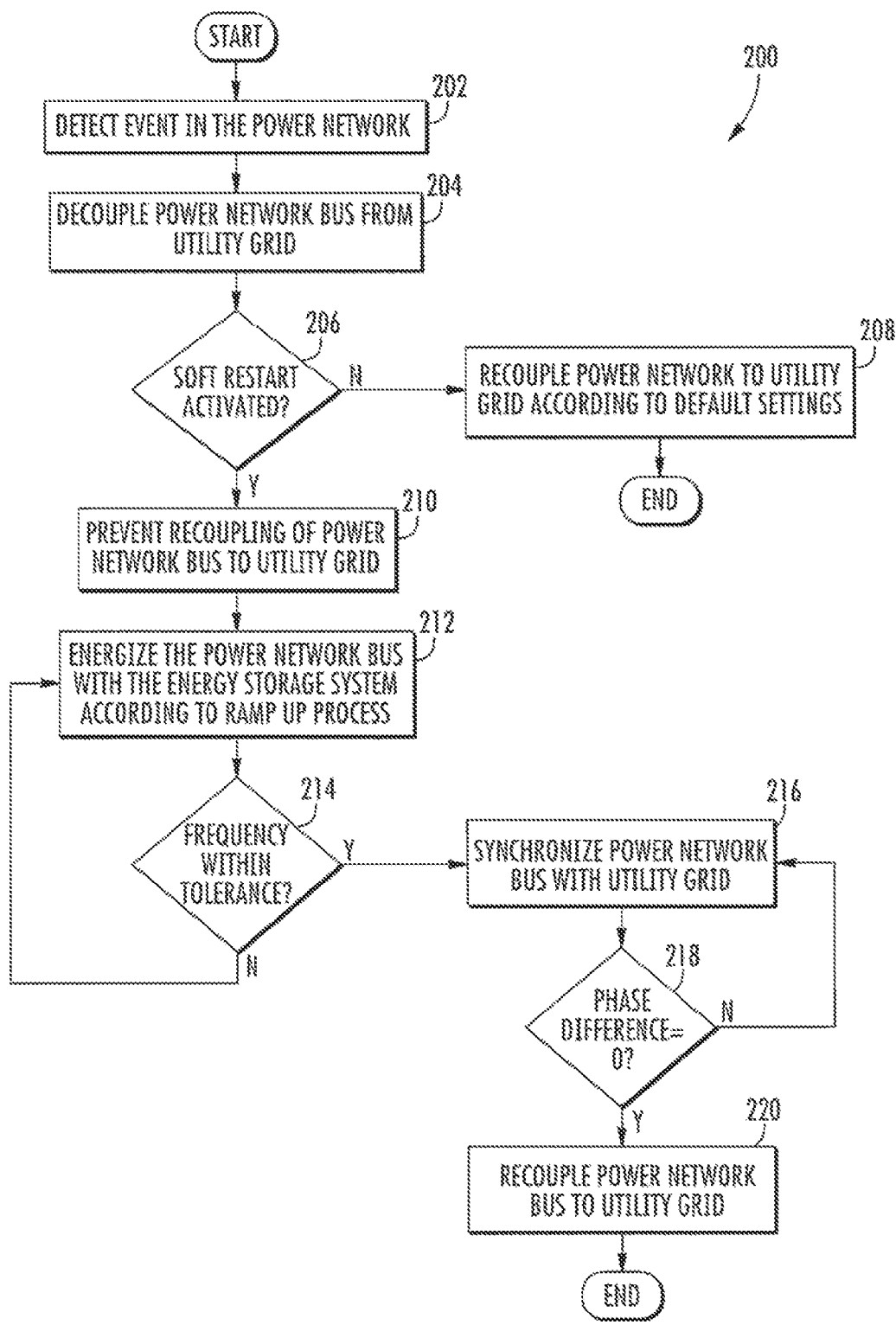
FIG. 2 depicts a flow diagram of an exemplary method of restoring service in a power network according to an exemplary embodiment of the present disclosure.

FIG. 2 depicts a flow diagram of an exemplary method (200) for restoring service in a power network according to exemplary embodiment of the present disclosure. The method (200) will be discussed with reference to the power network 100 of FIG. 1. However, the method (200) can be used in conjunction with any suitable power network having an inverter-controlled energy storage system. In addition, FIG. 2 depicts steps performed in a particular order for purposes of illustration and discussion. Those of ordinary skill in the art, using the disclosures provided herein, will understand that the various steps of any of the methods disclosed herein can be omitted, rearranged, combined and/or adapted in various ways.

At (202), the method includes detecting an event, such as a fault condition, in the power network. For instance, a fault can be detected at location A in the power network 100 of FIG. 1. In response to the fault condition, a power network bus can be decoupled from the utility grid as shown at (204) of FIG. 2. More particularly, one or more circuit breakers coupled between the power network bus and the utility grid can be tripped or opened to decouple the power network bus from the utility grid. Referring to the exemplary power network 100 of FIG. 1, the circuit breakers 110 and 112 can be tripped in response to the detection of a fault at location A in the power network 100. The circuit breaker 130 coupled between the energy storage system 120 and the power network bus 115 can also be tripped in response to fault condition.

At (206) of FIG. 2, the method can determine whether a soft restart mode has been activated. If the soft restart mode is not activated, the power network bus can be recoupled to the utility grid according to normal default settings. For instance, the one or more circuit breakers coupled between the power network bus and the utility grid can automatically be reclosed after some time period (e.g. 0.3 seconds). If the soft restart mode has been activated, the automatic recoupling of the power network bus to the utility grid can be prevented (210) such that the recoupling of the power network bus only occurs when the power network bus is synchronized with the utility grid. For instance, the automatic reclosing of the circuit breakers 110 and 112 coupled between the power network bus 115 and the utility grid 102 can be prevented until the power network bus 115 is synchronous with the utility grid 102.

Referring to FIG. 2 at (212), the power network bus can then be energized with the energy storage system according to a ramp up process. The power network bus can be energized by the energy storage system at any suitable time after decoupling the power network bus from the utility grid. For instance, the power network bus can be energized after a time period sufficient to allow the power network bus to achieve a dead bus condition. Alternatively, the power network bus can be energized prior to achieving the dead bus condition such that the energy storage system serves to "catch" the power network bus after decoupling the power network bus from the utility grid.

Referring to the exemplary power network 100 of FIG. 1, the circuit breaker 130 coupled between the energy storage system 120 and the power network bus 115 can be reclosed and the inverter 124 can be controlled, for instance by the control system 150, to provide a voltage ramp and a frequency ramp to the power network bus according to a ramp up process. The inverter 124 can be controlled to provide the voltage ramp and the frequency ramp according to an open loop control scheme or a closed loop control scheme. In an open loop control scheme, a linear or other suitable voltage ramp and frequency ramp having a constant slope are applied to the power network bus. In the closed loop control scheme, the voltage ramp and frequency ramp can be adjusted during the ramp up process so that the ramp up/energization of the power network bus occurs faster and such that the starting inrush current of the power network bus is maintained below a predefined threshold.

Figure 3:
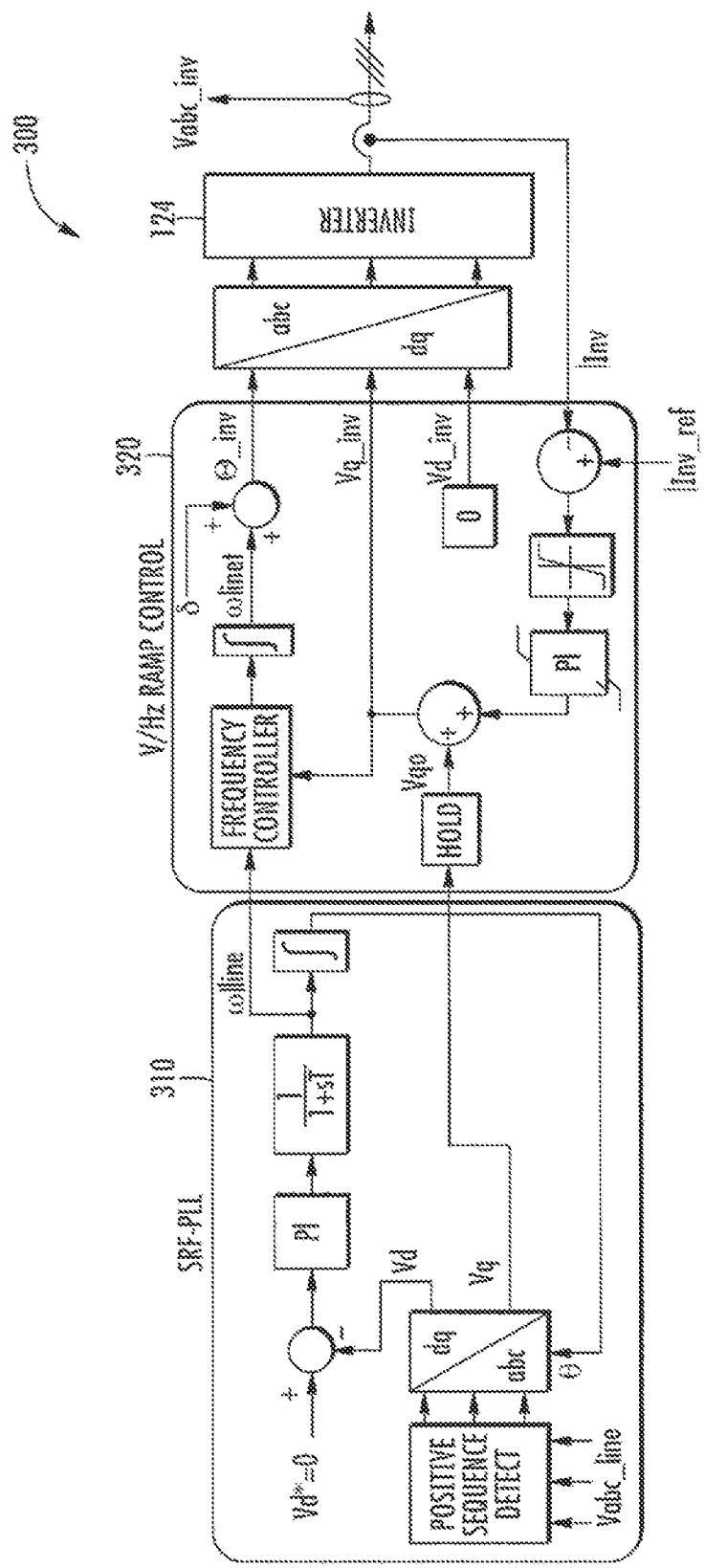
FIG. 3 depicts an exemplary control system for controlling an inverter according to a ramp up process according to an exemplary embodiment of the present disclosure.

FIG. 3 depicts an exemplary control schematic 300 for controlling the inverter 124 according to a closed loop control scheme pursuant to an exemplary embodiment of the present disclosure. A positive sequence detection of the line voltage $V_{abc\_line}$ can be used in conjunction with a synchronous reference frame phase locked loop (SRF-PLL) 310 to overcome grid unbalance, harmonics and notches and other kinds of disturbances. Vd* is set to zero, to obtain exact phase match condition as required by the SRF-PLL 310.

As shown in FIG. 3, the current error between $I_{inv}$ and a reference current set by the user $I_{inv\_ref}$, is used to adjust the slope of the voltage and frequency ramps supplied by the inverter of the energy storage system. The control variables are obtained by abc→dq transformation. $V_q$ and $\omega_{line}$ obtained from the SRF-PLL 310 are used as the inputs to the V/Hz ramp control 320. The V/Hz ramp control 320 can include a frequency controller and a $V_q$ controller for constant V/Hz control. $V_d$ is not used to adjust the magnitude and frequency of the V/Hz ramp and is set to zero.

The V/Hz control is used to provide angle input $\theta_{inv}$ and $V_{q\_inv}$ inputs to the inverter 124. Acceleration of $V_{q\_inv}$ over time is controlled by a PI controller and driven by the current error between the measured inverter current $I_{inv}$ and a preset inverter current reference $I_{inv\_ref}$. The slope of the voltage ramp can be adjusted by the PI controller. The angle input $\theta_{inv}$ can be determined to ensure a constant V/Hz operation during the ramp up process.

Referring back to FIG. 2 at (214), the method includes determining whether the frequency of the power network bus is within a tolerance of the frequency of the utility grid (e.g. 50/60 Hz). The tolerance can be set to any suitable level, such as within 5% of the frequency of the utility grid. If the frequency of the power network bus is not within the tolerance, the method can continue to energize the power network bus with the energy storage system according to the ramp up process until the frequency is within the tolerance of the frequency of the utility grid.

Once the frequency of the power network bus is within the tolerance of the frequency of the utility grid, the voltage ramp and the frequency ramp applied to the power network bus can be discontinued and the power network bus can be synchronized with the utility grid (216). The synchronization process can ensure that the voltage of the power network bus and the voltage of the utility grid are in phase.

In a particular implementation, the synchronization of the power network bus can include increasing or stepping up the frequency of the inverter (e.g. by 0.5 Hz). The phase difference of a voltage phase of the power network bus and a voltage phase of the utility grid can then be monitored (218). If the phase difference is not equal to about 0 (e.g. is not within 5% of 0), the method can continue the synchronization process. Once the phase difference is equal to about 0 (e.g. is within 5% of 0), the method can include recoupling the power network bus to the utility grid (220). For instance, referring to the exemplary power network 100 of FIG. 1, the circuit breakers 110 and 112 can be reclosed such that the power network bus 115 is recoupled to the utility grid 102.

Figure 4:
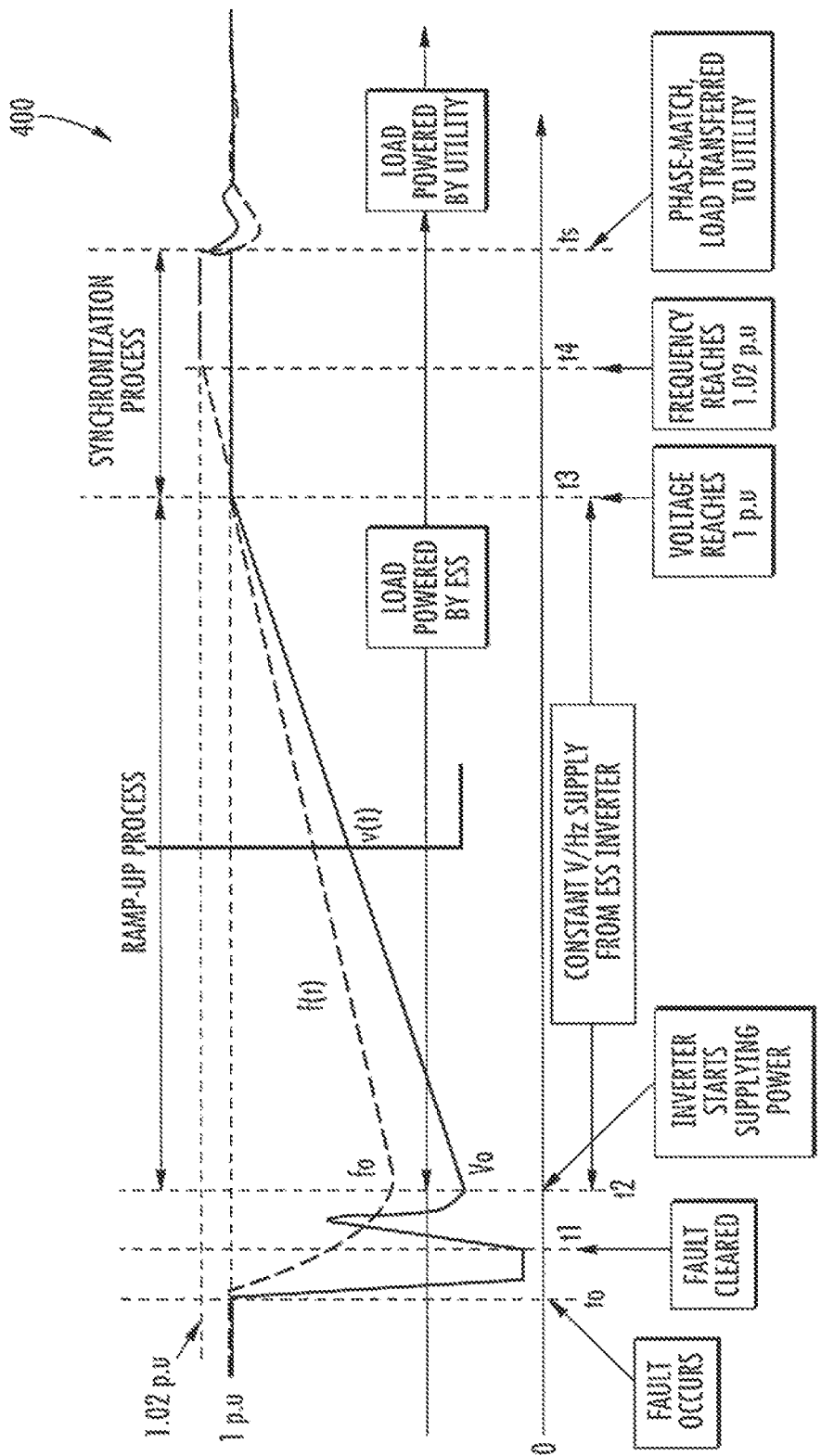
FIG. 4 depicts an exemplary timing diagram of an exemplary method for restoring service in a power network according to an exemplary embodiment of the present disclosure.
Figure 5:
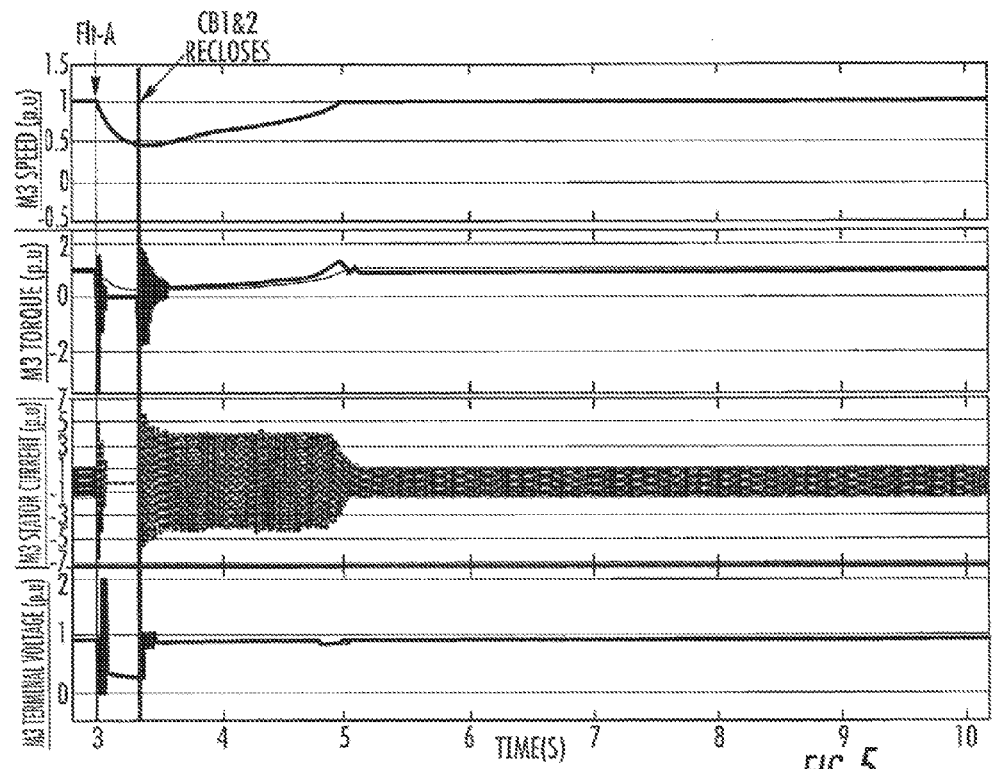
FIGS. 5-8 depict exemplary simulation results comparing service restoration using conventional techniques and service restoration using a method for restoring service according to an exemplary embodiment of the present disclosure.

FIG. 4 depicts an exemplary timing diagram 400 of an exemplary soft restart method according to exemplary aspects of the present disclosure. The timing diagram 400 will be discussed with reference to the power network 100 of FIG. 1.

At time $t_0$ a momentary (e.g. 20 cycle duration) 3-phase-to-ground fault occurs at location A in the exemplary power network 100 of FIG. 1. At time $t_1$, the circuit breakers 110 and 112 are tripped in response to an undervoltage relay. One or more of the circuit breakers 110 and 112 can be prevented from automatically reclosing to operate the power network bus in an islanded condition in response to the fault condition.

At time $t_2$, the voltage magnitude $V_0$ and the frequency $f_0$ at the power network bus 115 is measured. The circuit breaker 130 coupled between the energy storage system 120 is closed and the inverter 124 energizes the power network bus 115 with a ramp having a constant V/Hz characteristic starting at a magnitude of $V_0$ and $f_0$. The inverter current supplied by the inverter 124 to the power network bus 115 is controlled by adjusting the slope of the voltage and frequency ramps until the voltage and frequency of the power network bus 115 is within a specified tolerance of the voltage and frequency of the utility grid.

At time $t_3$, the voltage at the power network bus 115 can be within the tolerance (e.g. 1.0. p.u) and a sync-check relay can be activated to check for a voltage phase match between the power network bus 115 and the utility grid 102. The inverter frequency can be stepped up to a threshold, for instance, to 1.02 p.u. relative to the grid frequency, for synchronization. At time $t_4$, the frequency at the power network bus 115 reaches the threshold. At time $t_5$, the voltage phase between the power network bus 115 and the utility grid 102 match. The sync-check relay initiates the load transfer to the utility grid 102 by reclosing the circuit breakers 110 and 112 coupled between the power network bus 115 and the utility grid 102 and opening the circuit breaker 130 coupled between the energy storage system 120 and the power network bus 115.

EXAMPLE

A simulation was performed for the exemplary power network 100 depicted in FIG. 1 using the system and motor parameters given in Table 1 below:

TABLE 1

SYSTEM AND MOTOR PARAMETERS

| Parameters | Values | | |
|---|---|---|---|
| Base Power (kVA) | 600 | | |
| Base Voltage (V) | 480 | | |
| | Motors | | |
| | M1 | M2 | M3 |
| Rated power (HP) | 600 | 200 | 800 |
| PF (at rated speed) | 0.8 | 0.8 | 0.8 |
| Voltage (V) | 480 | 480 | 480 |
| Frequency (Hz) | 60 | 60 | 60 |
| Rated Current (A) | 1732 | 577 | 2308 |

TABLE 1-continued

SYSTEM AND MOTOR PARAMETERS

| | | | |
|---|---|---|---|
| Rated Speed (rpm) | 1780 | 890 | 1786 |
| Number of poles | 4 | 8 | 4 |
| Rotor + Load Inertia (kg-m$^2$) | 6 | 4 | 6 |
| H (s) | 0.145 | 0.1086 | 0.164 |
| Load Constant $B_1$ (N.m/(rad/s)$^2$) | 0.07618 | 0.192 | 0.1097 |
| $R_s$ (Ω) | 0.0076 | 0.0229 | 0.0057 |
| $R_s$ (Ω) | 0.006 | 0.018 | 0.0045 |
| $L_{Ls}$ (H) | 0.000178 | 0.000534 | 0.000371 |
| $L_{Ls}$ (H) | 0.0001 | 0.000313 | 0.0000078 |
| $L_m$ (H) | 0.0049 | 0.0147 | 0.0037 |

Three industrial grade squirrel cage induction motors (M1, M2, and M3) coupled to the same power network bus 115 with typical load inertias were used for simulation tests. The following two test cases were simulated to understand system behavior and advantages of soft restart method according to aspects of the present disclosure over the conventional method:

(1) Case-I: Using only motor M3 (800 HP, H=0.164 s) as load. Conventional and soft restart methods according to aspects of the present disclosure are compared.

(2) Case-II: Only M1 (600 HP, H=0.145 s) and M2 (200 HP, H=0.1086 s) are used and started at the same time using conventional and soft restart methods are compared.

The following steps take place during the simulation. A self-clearing 10 cycle 3-phase-to-ground fault is applied at location A between circuit breakers 110 and 112 at time=3 s. Considering an interrupting time of 3 cycles for circuit breakers 110 and 112, the fault is cleared at 3.05 s. For the conventional reclosing method, circuit breakers 110 and 112 are reclosed after 0.3 s (i.e. at 3.3 s).

When operating in the soft restart mode according to exemplary aspects of the present disclosure, circuit breaker 130 coupled between the energy storage system 120 and the power network bus 115 is closed and power ramp-up of the power network bus 115 starts after 3 s, for instance at 6.05 s. A ramp-up time of Tramp=2 s is selected for the soft restart method. An open loop control scheme is used to apply the power ramp up of the power network bus 115. This produces a linearly increasing V/Hz source with 196 V/s and 30 Hz/s, voltage and frequency slopes respectively. The power network bus 115 reaches 60 Hz and rated voltage of VLL=480 at 8.05 s.

The synchronizing process starts by stepping up the inverter frequency by 0.5 Hz at 8.15 s. Depending on the phase difference between the power network bus 115 and the utility grid 102, phase-synchronization will occur within 2 s where the grid frequency is 60 Hz and the inverter frequency is 60.5 Hz. In the simulation, the matched phase occurs at 8.76 s for Case I and Case II. A true value for a matched phase drives the relays to reclose circuit breakers 110 and 112 and trips off circuit breaker 130 to transfer the load to utility grid 102.

Figure 6:
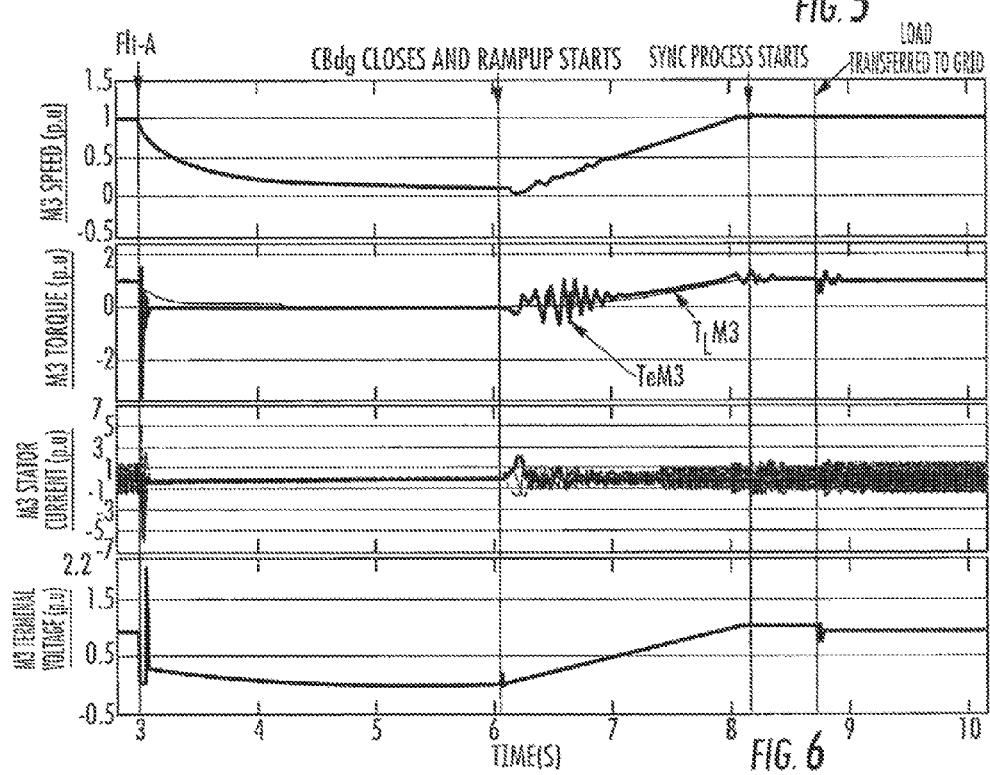

FIG. 6 depicts exemplary simulation results for Case I using the conventional reclosing process. As demonstrated in FIG. 6, the large inertia of the motor M3 does not allow the motor M3 to reach zero speed before the first reclosing of the circuit breakers 110 and 112 is attempted. A starting inrush current of about 5 p.u. is also accompanied by a 2 p.u. torque pulsation during reclosing.

Figure 7:
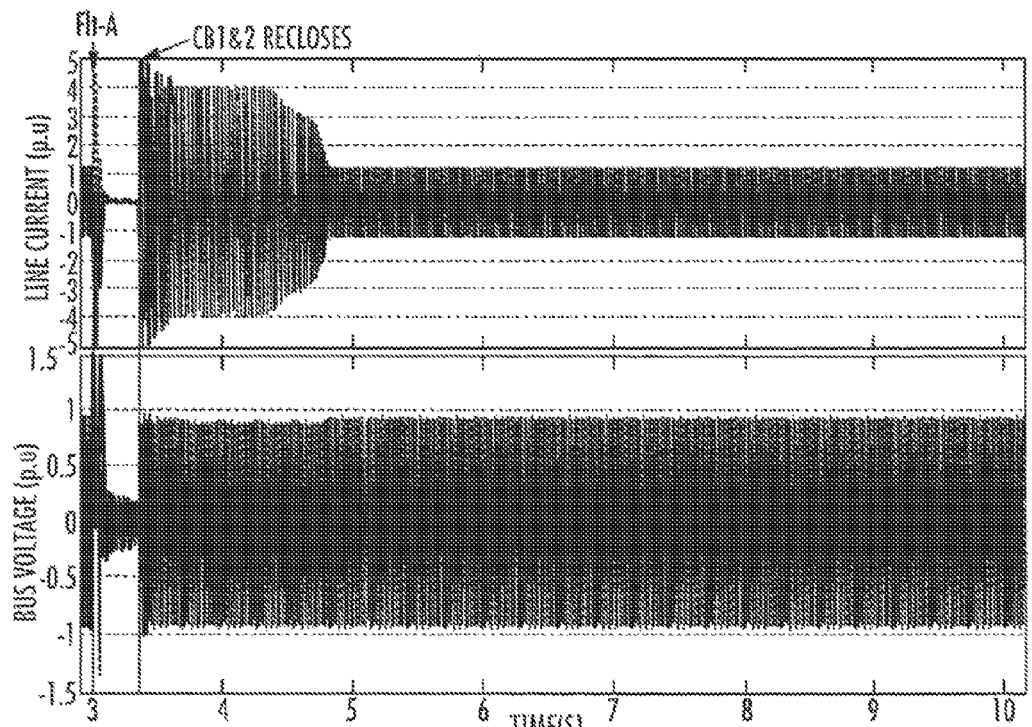

FIG. 7 depicts exemplary simulation results for Case I using the soft restarting method according to exemplary aspects of the present disclosure. Under the soft restarting method, the circuit breakers 110 and 112 are not allowed to reclose automatically. Instead, the energy storage system 120 is coupled to the power network bus 115 at about 6.05 s. The inverter 124 of the energy storage system 120 operates in open loop constant V/Hz control and drives the frequency of the power network bus to 60 Hz. With a 2 s ramp-up time, the stator current never exceeds 1 p.u. except at the very first cycle, where it is about 2 p.u.

Figure 8:
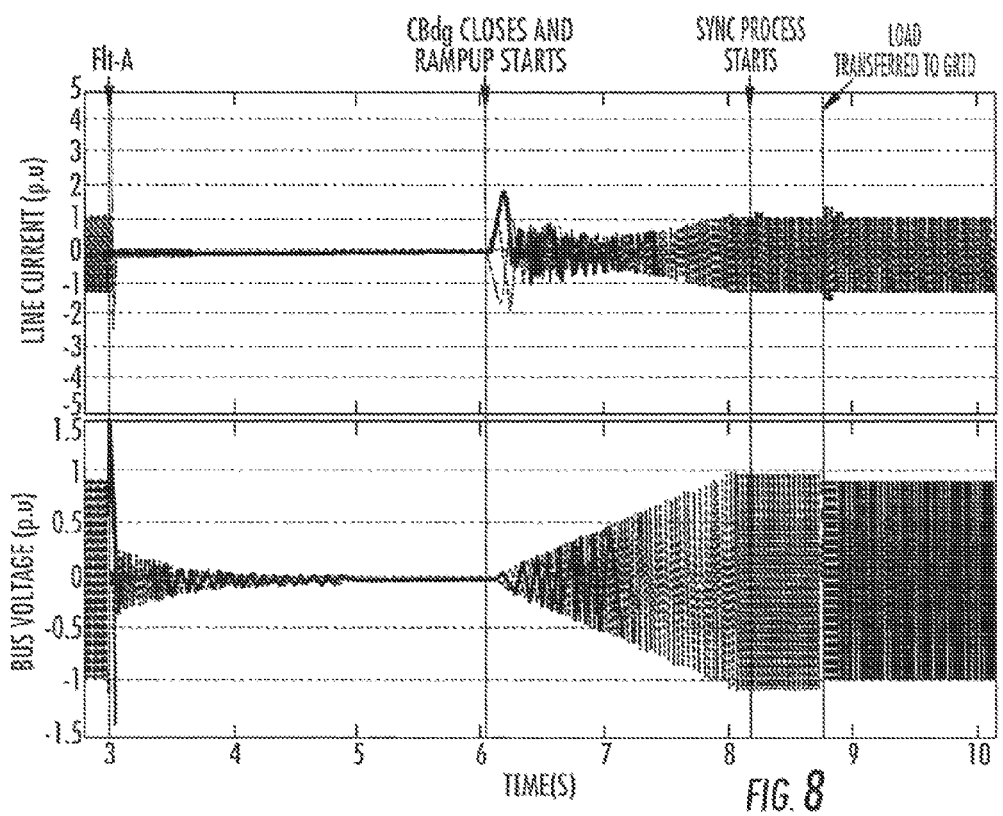

FIG. 8 depicts exemplary simulation results for Case II using the conventional reclosing process. As demonstrated in FIG. 8, the starting inrush current after reclosing of the circuit breakers can be as a high as 5.0 p.u. and can last for numerous cycles. FIG. 9 depicts exemplary simulation results for Case II using the soft restarting method according to exemplary aspects of the present disclosure. As demonstrated in FIG. 9, the line currents never actually increase beyond 1.0 p.u. except during the first cycle where it reaches about 2.0 p.u. when the soft restarting method according to exemplary aspects of the present disclosure is used.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of service restoration for a power network, the power network comprising a power network bus coupled to one or more industrial loads, the power network further comprising an energy storage system capable of being coupled to the power network bus, the energy storage system having an inverter that can be controlled to provide an inverter current from the energy storage system to the power network bus, the method comprising:
    decoupling the power network bus from a utility grid in response to an event;
    after decoupling, energizing the power network bus with the energy storage system via the inverter according to a ramp up process, wherein the ramp up process comprises controlling the inverter to apply a voltage ramp and a frequency ramp to the power network bus;
    synchronizing the power network bus with the utility grid; and
    recoupling the power network bus to the utility grid when the power network bus is synchronized with the utility grid.

2. The method of claim 1, wherein decoupling the power network bus from a utility grid in response to an event comprises opening one or more circuit breakers coupled between the power network bus and the utility grid.

3. The method of claim I, wherein the power network bus is energized with the energy storage system prior to the power network bus reaching a dead-bus state.

4. The method of claim 1, wherein energizing the power network bus comprises closing a circuit breaker coupled between the power network bus and the inverter.

5. The method of claim 1, wherein the inverter is controlled during the ramp up process according to an open loop control scheme.

6. The method of claim 1, wherein the ramp up process comprises controlling the inverter to adjust a slope of the voltage ramp and the frequency ramp based at least in part the inverter current.

7. The method of claim 1, wherein the ramp up process further comprises controlling the inverter to discontinue the voltage ramp and the frequency ramp when the voltage of the power network bus is within a voltage tolerance relative to the utility grid and when the frequency of the power network bus is within a frequency tolerance relative to the utility grid.

8. The method of claim 1, wherein synchronizing the power network bus with the utility grid comprises increasing the frequency of the inverter and monitoring a voltage phase of the power network bus and a voltage phase of the utility grid to determine when the voltage phase of the power network bus is synchronized with the voltage phase of the utility grid.

9. The method of claim 8, wherein the power network bus is recoupled to the utility grid when the voltage phase of the power network bus is synchronized with the voltage phase of the utility grid.

10. The method of claim 1, wherein recoupling the power network bus to the utility grid comprises closing one or more circuit breakers coupled between the power network bus and the utility grid.

11. The method of claim 1, wherein the event is a fault condition.

12. The method of claim 1, wherein the one or more industrial loads comprises one or more motors.

13. An industrial power network, comprising:
a power network bus coupled to a utility grid;
one or more industrial loads coupled to the power network bus;
an energy storage system capable of being coupled to the power network bus, the energy storage system comprising an inverter configured to be controlled to provide inverter current from the energy storage system to the power network bus;
a control system configured to implement one or more operations in response to an event to recouple the power network bus to the utility grid, the one or more operations comprising:
decoupling the power network bus from a utility grid in response to an event;
after decoupling, energizing the power network bus with the energy storage system via the inverter according to a ramp up process by controlling the inverter to apply a voltage ramp and a frequency ramp to the power network bus;
synchronizing the power network bus with the utility grid; and
recoupling the power network bus to the utility grid when the power network bus is synchronized with the utility grid.

14. The industrial power network of claim 13, wherein the control system is configured to perform the operation of controlling the inverter to apply a voltage ramp and a frequency ramp to the power network bus by controlling the inverter to adjust a slope of the voltage ramp based at least in part on the inverter current.

15. The industrial power network of claim 13, wherein the control system is configured to perform the operation of synchronizing the power network bus with the utility grid by increasing the frequency of the inverter and monitoring a voltage phase of the power network bus and a voltage phase of the utility grid to determine when the voltage phase of the power network bus is synchronized with the voltage phase of the utility grid.

16. A method of service restoration for a power network, comprising:
detecting a fault condition in the power network;
tripping one or more circuit breakers coupled between a power network bus and a utility grid in response to the fault condition;
energizing the power network bus with an inverter of an energy storage system using an open loop constant voltage/frequency ramp;
determining whether the frequency of the power network bus is within a tolerance of the frequency of the utility grid;
synchronizing the power network bus with the utility grid by stepping up the frequency of the inverter when the frequency of the power network bus is within the tolerance of the frequency of the utility grid;
determining whether a phase difference between a voltage phase of the power network bus and a voltage phase of the utility grid is about zero; and
reclosing the one or more circuit breakers coupled between the power network bus and the utility grid when the phase difference is about zero.

17. The method of claim 16, wherein the method further comprises decoupling the inverter of the energy storage system from the power network bus.

* * * * *